J. MONSON.
VEHICLE TIRE.
APPLICATION FILED OCT. 17, 1916.

1,248,149.

Patented Nov. 27, 1917.
2 SHEETS—SHEET 1.

WITNESSES
Edw. Thorpe

INVENTOR
Jöns Monson
BY
ATTORNEYS

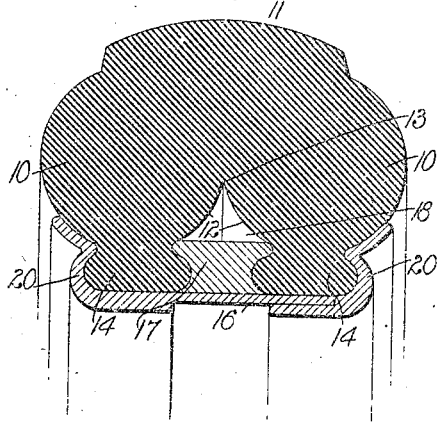
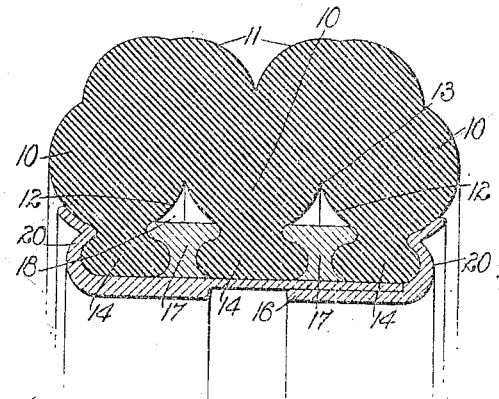
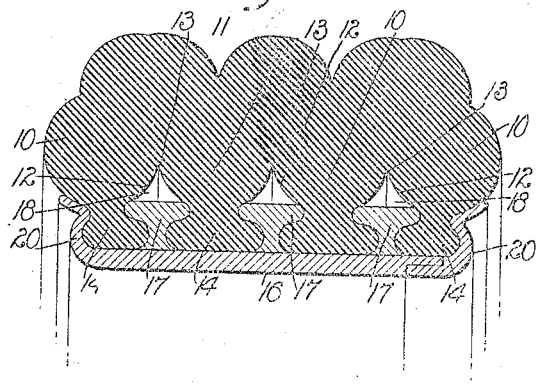
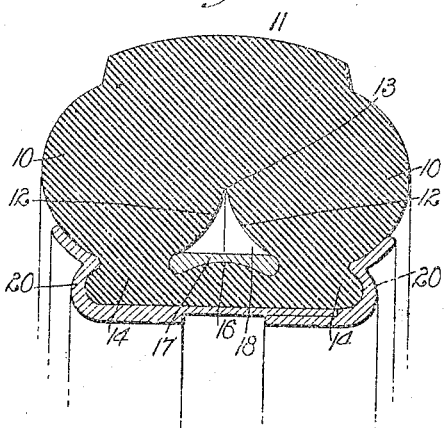

UNITED STATES PATENT OFFICE.

JÖNS MONSON, OF NEW YORK, N. Y.

VEHICLE-TIRE.

1,248,149.  Specification of Letters Patent.  Patented Nov. 27, 1917.

Application filed October 17, 1916. Serial No. 126,090.

*To all whom it may concern:*

Be it known that I, JÖNS MONSON, a subject of the King of Sweden, and a resident of the city of New York, borough of Manhattan, in the county and State of New York, have invented a new and improved Vehicle-Tire, of which the following is a full, clear, and exact description, this being a continuation of the application for Letters Patent of the United States, No. 9022, filed by me on February 18, 1915.

The invention relates to vehicle tires, such as shown and described in the Letters Patent of the United States, No. 1,177,350, granted to me on March 18, 1916.

The object of the present invention is to provide a new and improved vehicle tire of non-inflatable type and arranged to offer a gradually increasing resistance to stresses exerted upon it.

In order to accomplish the desired result, use is made of a plurality of individual tire bodies with tread in common.

A practical embodiment of the invention is represented in the accompanying drawings forming a part of this specification, in which similar characters of reference indicate corresponding parts in all the views.

Figs. 3 to 8 are cross sections of modified forms of the same.

Figure 1:
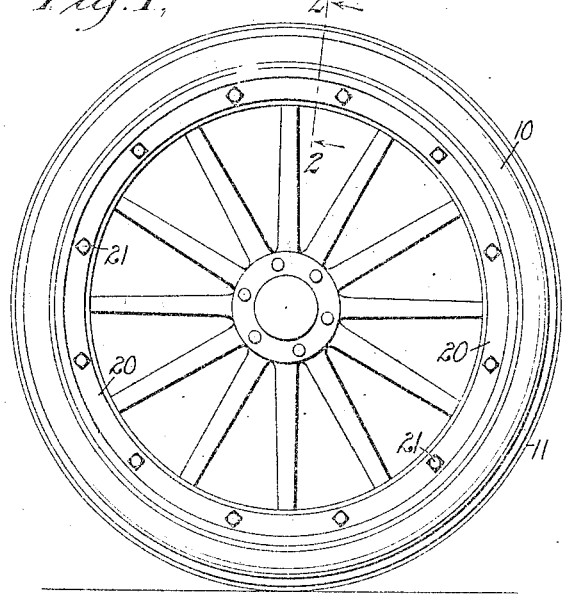
Figure 1 is a face view of a vehicle wheel provided with the improved vehicle tire.

The tire is made of rubber or other suitable material and in its general construction embodies a plurality of annular individual tire bodies 10 with tread 11 in common. The tire bodies are arranged one alongside the other in a transverse direction, and the adjacent inner faces 12 of the said tire bodies are integrally connected with each other and meet along an intermediate circumferential line 13. Each tire body is provided with an integral annular base 14 adapted to rest on the felly 15 (see Figs. 1, 2, 3 and 4), or on a demountable or other rim 16 (see Figs. 5, 6, 7 and 8) of any approved construction. The tire bodies 10 are preferably of an approximately circular shape in cross section and the bases 14 are preferably of dovetail shape in cross section and are spaced apart to accommodate a ring 17 of metal or other material and adapted to rest on the felly 15 of the rim 16, as plainly illustrated in the drawings. The ring 17 has beveled sides which fit onto the inner faces of the bases 14, and the peripheral face of each ring 17 forms with the corresponding inner faces 12 an annular chamber 18 approximately triangular in cross section. The outer faces of the bases 14 of the outermost tire are engaged by retaining flanges 20 either fastened by bolts or other fastening devices 21 to the felly 15, or formed integrally on the rim 16 as shown in Figs. 5, 6, 7 and 8.

Figure 2:
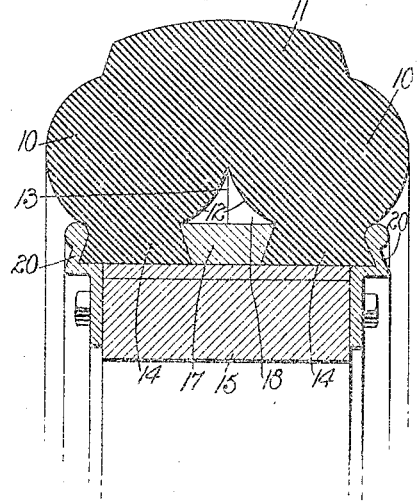
Fig. 2 is an enlarged cross section of the same on the line 2—2 of Fig. 1.
Figure 3:
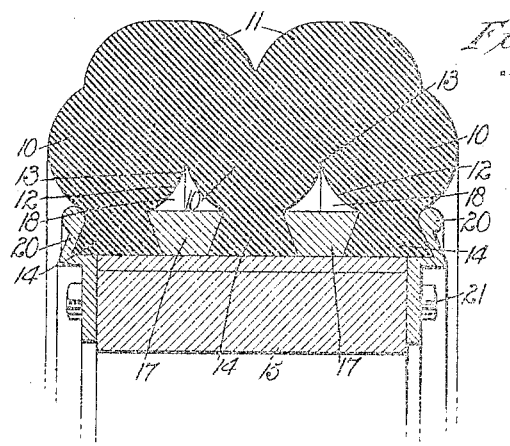
Figure 4:
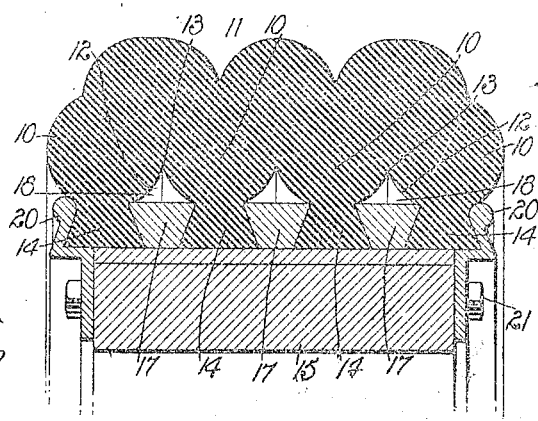

As shown in Figs. 2, 5 and 8 use is made of two individual tire bodies 10 and this vehicle tire is more especially designed for lighter vehicles, but for heavier vehicles the number of individual tire bodies 10 is correspondingly increased, that is, three such tire bodies may be used, as shown in Figs. 4 and 6, or four tire bodies may be associated for very heavy trucks, as indicated in Figs. 4 and 7. It is understood that initial stresses on the tread 11 of any one of the tires tends to bend the elastic material of the tire bodies and causes it to seat upon the peripheral face of the corresponding ring or band 17. Added stress upon the tread will cause a compression of the rubber or elastic material, thus giving rise to a greater resistance than that offered to the initial stress.

Having thus described my invention, I claim as new and desire to secure by Letters Patent:—

1. An elastic tire, comprising a plurality of individual tire bodies having bases dovetail shape in cross section, an integral tread and convex inner faces, said faces meeting each other along an intermediate circumferential line and forming a substantially triangular chamber opposite the tread to offer resistance to distortion in proportion to the pressure upon the tread.

2. An elastic tire, comprising a plurality of individual tire bodies having convex inner and outer faces and an integral tread, the inner faces of the bodies meeting on an intermediate circumferential line and forming a substantially triangular chamber opposite the tread to offer resistance to distortion in proportion to the pressure upon the tread, and a ring at the bottom of said chamber.

3. An elastic tire, comprising a tread and a plurality of individual tire bodies integral with the tread and having convex outer faces and spaced bases, the inner faces of the bodies being convex and meeting each other along an intermediate circumferential line and forming a circumferential substantially triangular chamber opposite the tread to offer a continually increasing resistance to distortion when pressure upon the tread is increased.

4. An elastic tire, comprising a tread and integral individual tire bodies, the outer and inner faces of which being convex and the inner faces of the said individual tire bodies meeting each other along an intermediate circumferential line and extending gradually inward and sidewise from said intermediate line of meeting to form a circumferential chamber directly opposite the tread to offer a continually increasing resistance to distortion when the pressure upon the said tread is increased, and a base ring fitting between the bases of the said individual tire bodies, the peripheral face of the ring forming a bottom for the said chamber and a seat for the inner faces of the tire bodies on subjecting the tread to pressure.

5. An elastic tire, comprising a tread and integral solid individual tire bodies, the outer and inner faces of which being convex, the inner faces of the said tire bodies meeting each other along an intermediate circumferential line and extending gradually inward and sidewise from said intermediate line of meeting to form a circumferential chamber directly opposite the tread to offer a continually increasing resistance to distortion when the pressure upon the said tread is increased, the inner or base portions of the said individual tire bodies being of dovetail shape in cross section, and a base ring fitting between the said base ends and having beveled sides fitting the corresponding sides of the base ends, the peripheral face of the ring forming a bottom for the said chamber and a seat for the inner face of the tire bodies on subjecting the tread to pressure.

6. The combination with a felly having side flanges, and elastic tire having a tread and a plurality of individual tire bodies integral with the tread, the outer and inner faces of the tire bodies being convex, the tire bodies having their bases in the form of dovetail tongues seated on the felly and the outer faces engaged by said side flanges, the inner faces of the tire bodies meeting each other along an intermediate circumferential line and extending gradually inward and sidewise from said intermediate circumferential line of meeting to form a circumferential chamber directly opposite the tread, the said chamber being approximately triangular in cross section, and a ring fitting between the bases of the tire bodies and resting on the peripheral face of the felly.

JÖNS MONSON.